United States Patent
Chen

(10) Patent No.: US 11,457,459 B2
(45) Date of Patent: Sep. 27, 2022

(54) COMMUNICATION MODE SELECTION METHOD AND APPARATUS

(71) Applicant: HUAWEI CLOUD COMPUTING TECHNOLOGIES CO., LTD., Guizhou (CN)

(72) Inventor: Xiaoguang Chen, Xi'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 85 days.

(21) Appl. No.: 16/930,609

(22) Filed: Jul. 16, 2020

(65) Prior Publication Data

US 2020/0351906 A1    Nov. 5, 2020

Related U.S. Application Data

(63) Continuation of application No. PCT/CN2019/070317, filed on Jan. 4, 2019.

(30) Foreign Application Priority Data

Jan. 18, 2018  (CN) .......................... 201810049898.X

(51) Int. Cl.
*H04W 72/12*    (2009.01)
*H04W 76/14*    (2018.01)
(Continued)

(52) U.S. Cl.
CPC ......... *H04W 72/1231* (2013.01); *H04W 4/40* (2018.02); *H04W 8/22* (2013.01);
(Continued)

(58) Field of Classification Search
CPC ... H04W 72/1231; H04W 76/14; H04W 4/40; H04W 8/22; H04W 72/0406;
(Continued)

(56) References Cited

U.S. PATENT DOCUMENTS

2010/0256835 A1\* 10/2010 Mudalige ............... G08G 1/164
701/2
2010/0256852 A1\* 10/2010 Mudalige ............... G08G 1/164
701/24
(Continued)

FOREIGN PATENT DOCUMENTS

CN    105657842 A    6/2016
CN    105764079 A    7/2016
(Continued)

OTHER PUBLICATIONS

Campolo, Claudia; Molinaro, Antonella; Berthet, Antoine O.; Vinel Alexey: "Full-Duplex Radios for Vehicular Communications", IEEE Communications Magazine, Jun. 2017 (Year: 2017).\*
(Continued)

*Primary Examiner* — Ayaz R Sheikh
*Assistant Examiner* — Louis Samara
(74) *Attorney, Agent, or Firm* — Conley Rose, P.C.

(57) ABSTRACT

A communication mode selection method includes transmitting, in a first communication mode, a vehicle-to-everything (V2X) service between a leading vehicle and a following vehicle that are in a vehicle platoon, obtaining, signal quality of the first communication mode, when the signal quality of the first communication mode meets a first preset condition, sending, a configuration instruction to the following vehicle, where the configuration instruction is used to instruct the following vehicle to communicate with the leading vehicle in a second communication mode, where the second communication mode is a communication mode in which a network device performs forwarding.

20 Claims, 6 Drawing Sheets

(51) Int. Cl.
*H04W 4/40* (2018.01)
*H04W 8/22* (2009.01)
*H04W 72/04* (2009.01)

(52) U.S. Cl.
CPC ..... *H04W 72/0406* (2013.01); *H04W 72/048* (2013.01); *H04W 76/14* (2018.02)

(58) Field of Classification Search
CPC ............. H04W 72/048; H04W 52/367; H04W 28/0215; H04W 4/80; H04W 72/121; H04L 5/0048; G08G 1/164
See application file for complete search history.

(56) References Cited

U.S. PATENT DOCUMENTS

| | | | |
|---|---|---|---|
| 2014/0315565 A1 | 10/2014 | Ihara et al. | |
| 2015/0282232 A1 | 10/2015 | Yamazaki | |
| 2016/0194014 A1 | 7/2016 | Rajendran | |
| 2017/0111122 A1 | 4/2017 | Shimizu et al. | |
| 2017/0215119 A1 | 7/2017 | Hong et al. | |
| 2017/0349176 A1 | 12/2017 | Alden et al. | |
| 2017/0353819 A1 | 12/2017 | Yin et al. | |
| 2018/0159935 A1* | 6/2018 | Cavalcanti | H04W 4/80 |
| 2018/0278385 A1* | 9/2018 | Wu | G05D 1/0295 |
| 2019/0254121 A1* | 8/2019 | Yang | H04W 36/14 |
| 2019/0313374 A1* | 10/2019 | Lee | H04L 1/0061 |
| 2019/0387377 A1* | 12/2019 | Zhang | H04W 52/383 |
| 2020/0107311 A1* | 4/2020 | Lee | H04W 4/40 |
| 2020/0229019 A1* | 7/2020 | Baek | H04W 28/0215 |
| 2020/0329412 A1* | 10/2020 | Shiga | H04W 4/06 |

FOREIGN PATENT DOCUMENTS

| | | | | |
|---|---|---|---|---|
| CN | 105791368 A | 7/2016 | | |
| CN | 105792137 A | 7/2016 | | |
| CN | 105812132 A | 7/2016 | | |
| CN | 105812133 A | 7/2016 | | |
| CN | 106297270 A | 1/2017 | | |
| CN | 106332122 A | 1/2017 | | |
| CN | 106559443 A | 4/2017 | | |
| CN | 106899629 A | 6/2017 | | |
| CN | 106961704 A | 7/2017 | | |
| CN | 107018162 A | 8/2017 | | |
| EP | 3316657 A1 | 5/2018 | | |
| EP | 3316658 A1 | 5/2018 | | |
| EP | 3357283 B1 * | 1/2021 | .......... | H04W 52/283 |
| JP | 2005297955 A | 10/2005 | | |
| JP | 2017076958 A | 4/2017 | | |
| WO | 2013069688 A1 | 5/2013 | | |
| WO | 2014065167 A1 | 5/2014 | | |
| WO | 2016108553 A1 | 7/2016 | | |
| WO | 2016206290 A1 | 12/2016 | | |
| WO | 2017055076 A1 | 4/2017 | | |
| WO | 2017171906 A1 | 10/2017 | | |
| WO | 2017209005 A1 | 12/2017 | | |
| WO | WO-2018153255 A1 * | 8/2018 | .............. | G08G 1/00 |

OTHER PUBLICATIONS

Georgios Karagiannis, Onur Altintas, Eylem Ekici, Geert Heijenk, Boangoat Jarupan, Kenneth Lin, and Timothy Weil: Vehicular Networking: A survey and Tutorial on Requirements, Architectures, Challenges, Standards and Solutions; IEEE Communications Surveys & tutorials, vol. 13, No. 4, Fourth Quarter 2011 (Year: 2011).*

Miao Xiangyang, et al., "Analysis and Countermeasure of Safety Challenging Factors for Autonomous Driving Vehicles," Shanghai Auto,doi:10. 3969 /j. issn.1007-4554. Jan. 8, 2018, with an English abstract, 5 pages.

Barbara M. Masini, et al.."Radio Access for Future 5G Vehicular Networks," 2017 IEEE 86th Vehicular Technology Conference (VTC-Fall), 7 pages.

3GPP TR 22 886 V15.1.0, Mar. 2017, "3rd Generation Partnership Project; Technical Specification Group Services and System Aspects; Study on enhancement of 3GPP Support for 5G V2X Services (Release 15)," 58 pages.

State Council "Made in China 2025," State Council Circular No. [2015], May 8, 2015, 47 pages.

3GPP TS 22.186 V15.2.0, Sep. 2016, "3rd Generation Partnership Project; Technical Specification Group Services and System Aspects; Enhancement of 3GPP support for V2X scenarios; Stage 1 (Release 15)," 16 pages.

3GPP TS 23.285 V14.5 0, Dec. 2017, "3rd Generation Partnership Project; Technical Specification Group Services and System Aspects; Architecture enhancements for V2X services (Release 14)," 36 pages.

3GPP TR 23.786 V0.3.0, Jan. 2018 "3rd Generation Partnership Project; Technical Specification Group Services and System Aspects; Study on architecture enhancements for EPS and 5G System to support advanced V2X services (Release 16)," 19 pages.

IEEStd 802.11p™—2010 "Part 11: Wireless LAN Medium Access Control (MAC) and Physical Layer (PHY) Specifications Amendment 6: Wireless Access in Vehicular Environments, IEEE Computer Society," Jun. 17, 2010, 51 pages.

* cited by examiner

COMMUNICATION MODE SELECTION METHOD AND APPARATUS

CROSS-REFERENCE TO RELATED APPLICATIONS

This application is a continuation of International Patent Application No. PCT/CN2019/070317 filed on Jan. 4, 2019, which claims priority to Chinese Patent Application No. 201810049898.X filed on Jan. 18, 2018. The disclosures of the aforementioned applications are hereby incorporated by reference in their entireties.

TECHNICAL FIELD

Embodiments of this application relate to the field of Internet of vehicles Vehicle-to-Everything (V2X) technologies, and in particular, to a communication mode selection method, an apparatus, and a vehicle.

BACKGROUND

In a V2X technology, vehicle information is provided using a sensor, a vehicle-mounted terminal, and an electronic label that are mounted on a vehicle, interconnection and interworking of vehicle-to-vehicle (V2V), vehicle-to-pedestrian (V2P), and vehicle-to-infrastructure (V2I) are implemented using various communications technologies, and information is effectively used, for example, is extracted and is shared, on an information network platform such that effective control is performed on and an integrated service is provided for the vehicle.

Platooning is an important application in the V2X field. The platooning means that through V2V communication, a plurality of vehicles are interconnected with each other with a low delay such that a queue in which the plurality of vehicles simultaneously travel forms. In the queue, a first vehicle in a direction of forward motion is a leading vehicle (LV), and another vehicle is a following vehicle (FV). All the vehicles automatically keep a distance with each other while travelling, and no matter the leading vehicle is accelerated, decelerated, steered, or braked, the following vehicle synchronously completes a same motion in real time. Direct communication is implemented between the leading vehicle and the following vehicle using a device-to-device (D2D) technology. For example, a direct link is established between the leading vehicle and the following vehicle using a PC5 interface, and a V2X service is transmitted using the direct link, for example, information such as a location, a road topology, a traffic light, steering, braking, and a lane change.

When the V2X service is transmitted between the leading vehicle and the following vehicle in a direct communication mode, poor signal quality (for example, signal congestion, signal interference, and incomplete signal coverage) may occur. Consequently, service continuity is affected, and travelling safety of the vehicle is threatened.

SUMMARY

This application provides a communication mode selection method, an apparatus, and a vehicle such that a problem in other approaches is that travelling safety of a vehicle is threatened because service continuity is affected due to poor signal quality when a V2X service is transmitted between a leading vehicle and a following vehicle in a direct communication mode is resolved.

According to one aspect, this application provides a communication mode selection method. The method includes transmitting, in a first communication mode, a V2X service between a leading vehicle and a following vehicle that are in a vehicle platoon, where the first communication mode is a direct communication mode, obtaining, by the leading vehicle, signal quality of the first communication mode, when the signal quality of the first communication mode meets a first preset condition, sending, by the leading vehicle, a configuration instruction to the following vehicle, where the configuration instruction is used to instruct the following vehicle to enable a second communication mode to communicate with the leading vehicle, receiving, by the following vehicle, the configuration instruction sent by the leading vehicle, and enabling, by the following vehicle based on the configuration instruction, the second communication mode to communicate with the leading vehicle, where the second communication mode is a communication mode in which a network device performs forwarding.

In the solution provided in this application, when the signal quality of the first communication mode meets the first preset condition, the leading vehicle sends the configuration instruction to the following vehicle such that the following vehicle is triggered to enable the second communication mode to communicate with the leading vehicle. Because the second communication mode is the communication mode in which a network device performs forwarding, compared with the direct communication mode, the second communication mode has more stable signal quality. Therefore, it is ensured that service continuity between the leading vehicle and the following vehicle is not affected, and travelling safety of the vehicle is prevented from being threatened.

In a possible design, the signal quality is signal reliability. The obtaining, by the leading vehicle, signal quality of the first communication mode includes obtaining, by the leading vehicle, signal reliability that is of communication with the following vehicle in the first communication mode and that is in a first time window, where the first preset condition includes that the signal reliability in the first time window is less than a first threshold.

In the solution provided in this application, the signal reliability is used as the signal quality. By obtaining the signal reliability that is of communication with the following vehicle in the first communication mode and that is in the first time window, the leading vehicle accurately obtains the signal quality of the first communication mode.

In another possible design, before the sending, by the leading vehicle, a configuration instruction to the following vehicle, the method further includes, when the signal quality of the first communication mode meets the first preset condition, obtaining, by the leading vehicle, a service type of the V2X service, and if the service type of the V2X service is a first service type, performing, by the leading vehicle, a step of sending the configuration instruction to the following vehicle.

In the solution provided in this application, when determining that a service type of a currently transmitted V2X service is the first service type, the leading vehicle sends, to the following vehicle, the configuration instruction used to indicate enabling of the second communication mode. In this way, reliable transmission of an important service can be ensured, and in addition, the second communication mode is prevented from being enabled when a non-important service is transmitted such that a communication resource is saved.

In still another possible design, the foregoing method further includes, when the signal quality of the first communication mode meets the first preset condition, determining, by the leading vehicle based on V2X capability information of the following vehicle, whether the following vehicle supports the second communication mode, where the V2X capability information is used to indicate a communication mode supported by the following vehicle, and if the following vehicle supports the second communication mode, performing, by the leading vehicle, the step of sending the configuration instruction to the following vehicle, or if the following vehicle does not support the second communication mode, removing, by the leading vehicle, the following vehicle from the vehicle platoon.

In the solution provided in this application, the leading vehicle determines, based on the V2X capability information, whether the following vehicle supports the second communication mode. When the following vehicle does not support the second communication mode, the leading vehicle removes the following vehicle from the vehicle platoon, to avoid that travelling safety of another vehicle is threatened because travelling of the other vehicle is affected by the following vehicle.

In still another possible design, before the transmitting, in a first communication mode, a V2X service between a leading vehicle and a following vehicle, the method further includes sending, by the following vehicle, the V2X capability information of the following vehicle to the leading vehicle, and receiving and storing, by the leading vehicle, the V2X capability information of the following vehicle.

In the solution provided in this application, the leading vehicle obtains and stores the V2X capability information of the following vehicle, to subsequently determine, based on the V2X capability information, whether the following vehicle supports the second communication mode. When the following vehicle does not support the second communication mode, the leading vehicle removes the following vehicle from the vehicle platoon, to avoid that the travelling safety of the other vehicle is threatened because the travelling of the other vehicle is affected by the following vehicle.

In still another possible design, the foregoing method further includes determining, by the leading vehicle, a second time window and a second threshold that correspond to the following vehicle, and sending, by the leading vehicle, the second time window and the second threshold to the following vehicle, where the following vehicle is configured to, when detecting that signal reliability that is of communication with the leading vehicle in the first communication mode and that is in the second time window is less than the second threshold, enable the second communication mode to communicate with the leading vehicle.

In the solution provided in this application, the second time window and the second threshold are sent to the following vehicle such that the following vehicle can independently determine whether to enable the second communication mode to communicate with the leading vehicle. In this way, it is ensured that the service continuity between the leading vehicle and the following vehicle is not affected, and travelling safety of the vehicle is prevented from being threatened.

In still another possible design, after the transmitting, in a first communication mode, a V2X service between a following vehicle and a leading vehicle, the method further includes obtaining, by the following vehicle, the signal quality of the first communication mode, and when the signal quality of the first communication mode meets a second preset condition, enabling, by the following vehicle, the second communication mode to communicate with the leading vehicle.

In the solution provided in this application, when the signal quality of the first communication mode meets the second preset condition, the following vehicle automatically enables the second communication mode to communicate with the leading vehicle. Because the second communication mode is the communication mode in which a network device performs forwarding, compared with the direct communication mode, the second communication mode has more stable signal quality. Therefore, it is ensured that the service continuity between the leading vehicle and the following vehicle is not affected, and the travelling safety of the vehicle is prevented from being threatened.

In still another possible design, the signal quality is the signal reliability. The obtaining, by the following vehicle, the signal quality of the first communication mode includes obtaining, by the following vehicle, signal reliability that is of communication with the leading vehicle in the first communication mode and that is in the second time window, where the second preset condition includes that the signal reliability in the second time window is less than the second threshold.

In the solution provided in this application, the signal reliability is used as the signal quality. By obtaining the signal reliability that is of communication with the leading vehicle in the first communication mode and that is in the second time window, the following vehicle accurately obtains the signal quality of the first communication mode.

In still another possible design, the method further includes, when the signal quality of the first communication mode meets the second preset condition, if the following vehicle does not support the second communication mode, travelling, by the following vehicle, away from the vehicle platoon.

In the solution provided in this application, when the following vehicle does not support the second communication mode, the following vehicle actively travels away from the vehicle platoon, to avoid threatening the travelling safety of the other vehicle because of affecting the travelling of the vehicle.

According to another aspect, this application provides an in-vehicle communications apparatus. The apparatus has a function of implementing the foregoing method. The function may be implemented by hardware, or may be implemented by hardware by executing corresponding software. The hardware or software includes one or more modules corresponding to the foregoing function.

In a possible design, a structure of the in-vehicle communications apparatus includes a processor and a communications interface. The processor is configured to support the in-vehicle communications apparatus in performing the corresponding functions in the foregoing method. The communications interface is configured to support communication between the in-vehicle communications apparatus and another apparatus or device. Further, the in-vehicle communications apparatus may further include a memory. The memory is configured to be coupled to the processor, and the memory stores a program instruction and data that are required by the in-vehicle communications apparatus.

According to still another aspect, this application provides a vehicle. The vehicle includes the in-vehicle communications apparatus in the foregoing aspect.

According to still another aspect, this application provides a computer storage medium configured to store a computer software instruction used by an in-vehicle communications apparatus. The computer storage medium includes a program designed for performing the foregoing aspects.

According to still another aspect, the embodiments of this application provide a computer program product. When the computer program product is executed, the computer program product is configured to perform the method in the foregoing aspect.

DESCRIPTION OF EMBODIMENTS

To make the objectives, technical solutions, and advantages of this application clearer, the following further describes the implementations of this application in detail with reference to the accompanying drawings.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1:
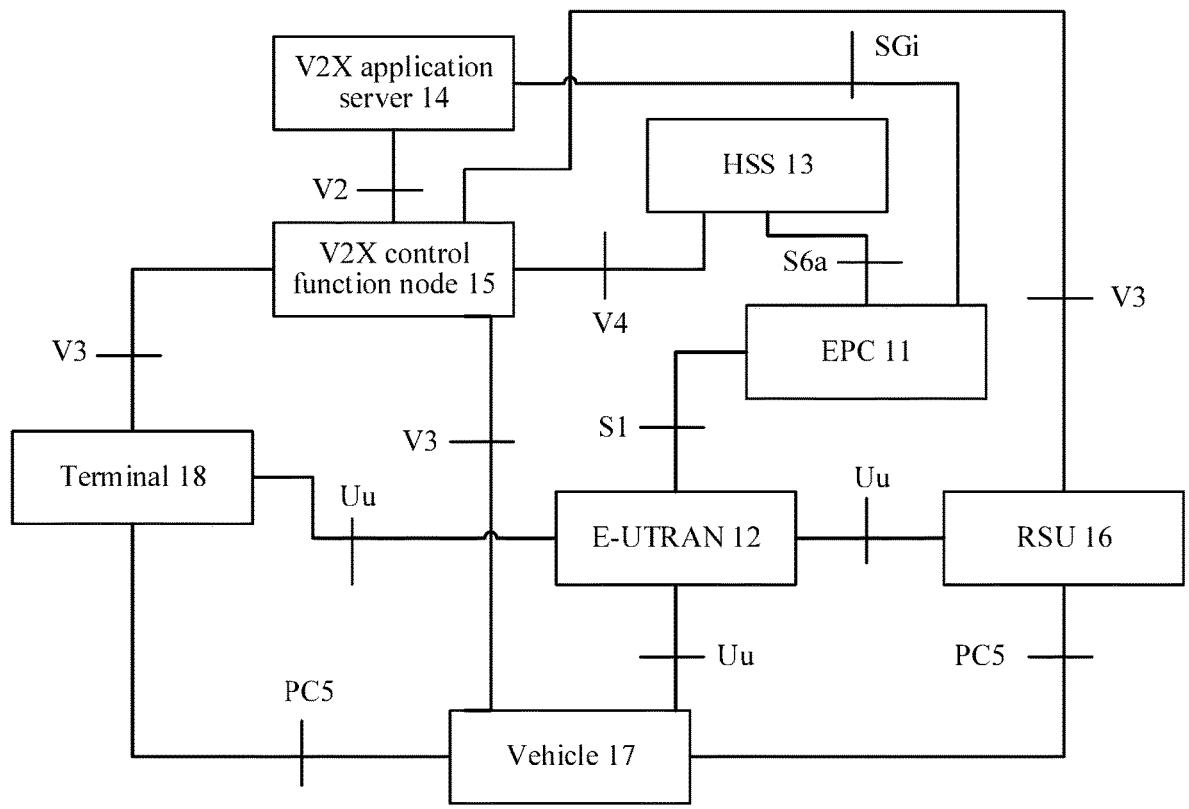
FIG. 1 is a schematic diagram of a network architecture according to an embodiment of this application.
Figure 2:
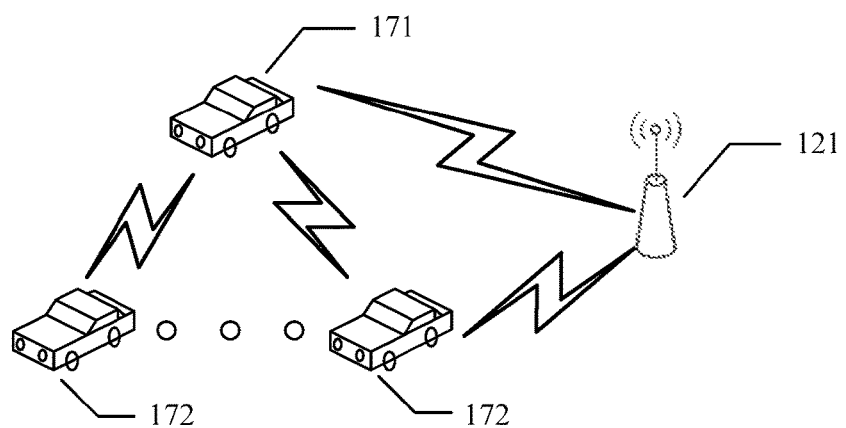
FIG. 2 is a schematic diagram of an application scenario of platooning according to an embodiment of this application.

The following first describes some possible network architectures and application scenarios in the embodiments of this application with reference to FIG. 1 and FIG. 2.

FIG. 1 is a schematic diagram of a network architecture to which the embodiments of this application are applicable. In the network architecture, a Long-Term Evolution (LTE) system is merely used as an example. The network architecture may include an Evolved Packet Core (EPC) 11, an evolved Universal Mobile Telecommunications System (UMTS) Terrestrial Radio Access Network (E-UTRAN) 12, a home subscriber server (HSS) 13, a V2X application server 14, a V2X control function node 15, a roadside unit (RSU) 16, a vehicle 17, and a terminal 18.

The EPC 11 is a core network of the LTE system. The core network includes several core network devices. Main functions of the core network device are to provide a user connection, manage a user, complete service carrying, and act as a bearer network to provide an interface to an external network. For example, the EPC 11 includes a mobility management entity (MME), a serving gateway (S-GW), and a PDN gateway (P-GW).

The E-UTRAN 12 is an access network of the LTE system. The access network includes several access network devices. The access network device may be a base station (BS), and the base station is an apparatus deployed in the access network to provide a wireless communication function for the terminal 16. The base station may include a macro base station, a micro base station, a relay station, an access point, and the like in various forms. In a system using different radio access technologies, a name of a device having a base station function may vary. For example, the device is referred to as an evolved NodeB eNB) in the LTE system, or referred to as a NodeB in a third generation (3G) communications system.

The terminal 18 may include various handheld devices, vehicle-mounted devices, wearable devices, or computing devices that have wireless communication functions, or another processing device connected to a wireless modem, and user equipment (UE), mobile stations (MSs), terminal devices, and the like in various forms. For ease of description, the devices mentioned above are collectively referred to as the terminal.

The access network device and the core network device communicate with each other using an air interface technology, for example, an S1 interface. The access network device and the terminal 18 also communicate with each other using an air interface technology, for example, a Uu interface.

The HSS 13 is configured to manage subscription data of the user and location information of the terminal 18. The HSS 13 and the core network device (for example, the MME) may communicate with each other using an S6a interface.

The V2X application server 14 is mainly configured to receive and store information reported by the RSU 16, the vehicle 17, and the terminal 18, and respond to a request from the RSU 16, the vehicle 17, and the terminal 18. For example, during platooning, the V2X application server 14 can determine, based on information reported by a leading vehicle and the information reported by the RSU 16, a travelling policy, such as a travelling route and a travelling speed, of a vehicle platoon to which the leading vehicle and a following vehicle belong, and deliver the travelling policy to the leading vehicle using the EPC 11 and the E-UTRAN 12. The V2X application server 14 can be applied to different operator networks. The V2X application server 14 and the core network device may communicate with each other using an SGi interface.

The V2X control function node 15 is configured to deliver a V2X service authorization parameter to the vehicle 17 and the terminal 18. The V2X service authorization parameter is used to indicate a type of V2X communication that can be performed by the vehicle 17 and the terminal 18, for example, V2V communication, V2P communication, and V2I communication. The V2X control function node 15 and the V2X application server 14 may communicate with each other using a V2 interface, the V2X control function node 15 may communicate with the vehicle 17 and the terminal 18 using a V3 interface, and the V2X control function node 15 and the HSS 13 may communicate with each other using a V4 interface.

The RSU 16 may include a microwave read/write device and a controller. The RSU 16 is configured to receive the information reported by the vehicle 17, and deliver traffic information of a road to the vehicle 17. The RSU 16 has a data storage and processing capability, and can quickly and accurately detect the traffic information such as a road condition and a travelling vehicle, and then send the traffic information to the vehicle 17 after processing the traffic information. The RSU 16 and the access network device may communicate with each other using an air interface technology, for example, the Uu interface.

The vehicle 17 may be a self-driving vehicle or a non-self-driving vehicle. In the V2X field, the platooning means that a plurality of vehicles 17 are interconnected with each other with a low delay such that a queue in which the plurality of vehicles simultaneously travel forms for travelling. The vehicle 17 has an in-vehicle communications apparatus, and the vehicle 17 communicates with another vehicle, the terminal 18, or another device using the in-vehicle communications apparatus, for example, the RSU 16. The in-vehicle communications apparatus may be an apparatus integrated into a vehicle-mounted communications box (T-BOX), or may be an apparatus separated from the vehicle body. In addition, the in-vehicle communications apparatus may be assembled in the vehicle 17 before the vehicle 17 is delivered from a factory, or may be assembled in the vehicle 17 after the vehicle 17 is delivered from a factory. The in-vehicle communications apparatus of the vehicle 17 and the terminal 18 may communicate with each other using a PC5 interface. For example, the terminal 18 sends location information of the terminal 18 to the vehicle 17 using the PC5 interface. The in-vehicle communications apparatus of the vehicle 17 and the RSU 16 may communicate with each other using the PC5 interface. For example, the RSU 16 sends traffic information of a remote road to the vehicle 17 using the PC5 interface. In addition, the in-vehicle communications apparatus of the vehicle 17 and the access network device (for example, the eNB of the LTE system) may also communicate with each other using an air interface technology, for example, the Uu interface.

It should be noted that in the network architecture shown in FIG. 1, the LTE system is merely used as an example for description. The technical solutions described in this application may be applied to the LTE system, or other wireless communications systems using various radio access technologies, for example, a system using an access technology such as code-division multiple access (CDMA), frequency-division multiple access (FDMA), time-division multiple access (TDMA), orthogonal frequency-division multiple access (OFDMA), or a single-carrier FDMA (SC-FDMA). In addition, the technical solutions may be applied to a subsequent evolved system of the LTE system, for example, a next-generation network system, that is, a 5th generation (5G) system. In the embodiments of this application, nouns "network" and "system" are usually interchangeably used, but meanings of the nouns may be understood by a person skilled in the art.

FIG. 2 is a schematic diagram of a platooning scenario. In an application scenario of the platooning, the plurality of vehicles 17 are formed into one vehicle platoon for travelling, and each vehicle platoon includes a leading vehicle 171 and at least one following vehicle 172.

The leading vehicle 171 is a first vehicle in the vehicle platoon in a direction of forward motion, and is configured to create and manage the vehicle platoon. The leading vehicle 171 sends, to the RSU 16, traffic information detected by the leading vehicle 171 and traffic information reported by the following vehicle 172, and receives the traffic information of the remote road delivered by the RSU 16. The traffic information is used to indicate a road traffic status, for example, whether a road ahead is congested, whether the road is smooth, and whether another vehicle is near. The leading vehicle 171 may further communicate with the V2X application server 14 using the E-UTRAN 12, and receive the travelling policy delivered by the V2X application server 14.

The following vehicle 172 is configured to receive the travelling policy sent by the leading vehicle 171, and send traffic information detected by the following vehicle 172 to the leading vehicle 171.

Direct communication is implemented between the leading vehicle 171 and the following vehicle 172 and between different following vehicles 172 using a D2D technology. A communication mode implemented using the D2D technology is referred to as a direct communication mode. For example, communication is performed using a direct link established using the PC5 interface, or communication is performed using a direct link established using a dedicated short range communication (DSRC) technology. In addition to the direct communication mode, communication between the leading vehicle 171 and the following vehicle 172 may also be performed in a communication mode in which a network device performs forwarding. The network device may be the access network device 121, or may include the access network device 121 and the core network device, or may include the access network device 121, the core network device, and the V2X application server 14. For example, when the network device is the access network device 121, the leading vehicle 171 or the following vehicle 172 sends, to the access network device 121, information that needs to be sent to the following vehicle 172 or the leading vehicle 171, and then the access network device 121 forwards the information to the following vehicle 172 or the leading vehicle 171. For another example, when the network device includes the access network device 121 and the core network device, the leading vehicle 171 or the following vehicle 172 sends, to an access network device 121 accessed by the leading vehicle 171 or the following vehicle 172, the information that needs to be sent to the following vehicle 172 or the leading vehicle 171. The access network device 121 accessed by the leading vehicle 171 or the following vehicle 172 forwards the information to the core network device, and then the core network device forwards the information to an access network device 121 accessed by the following vehicle 172 or the leading vehicle 171. Then, the access network device 121 accessed by the following vehicle 172 or the leading vehicle 171 delivers the information to the following vehicle 172 or the leading vehicle 171. The access network device 121 accessed by the leading vehicle 171 or the following vehicle 172 and the access network device 121 accessed by the following vehicle 172 or the leading vehicle 171 may be a same access network device 121, or may be two different access network devices 121.

Figure 3:
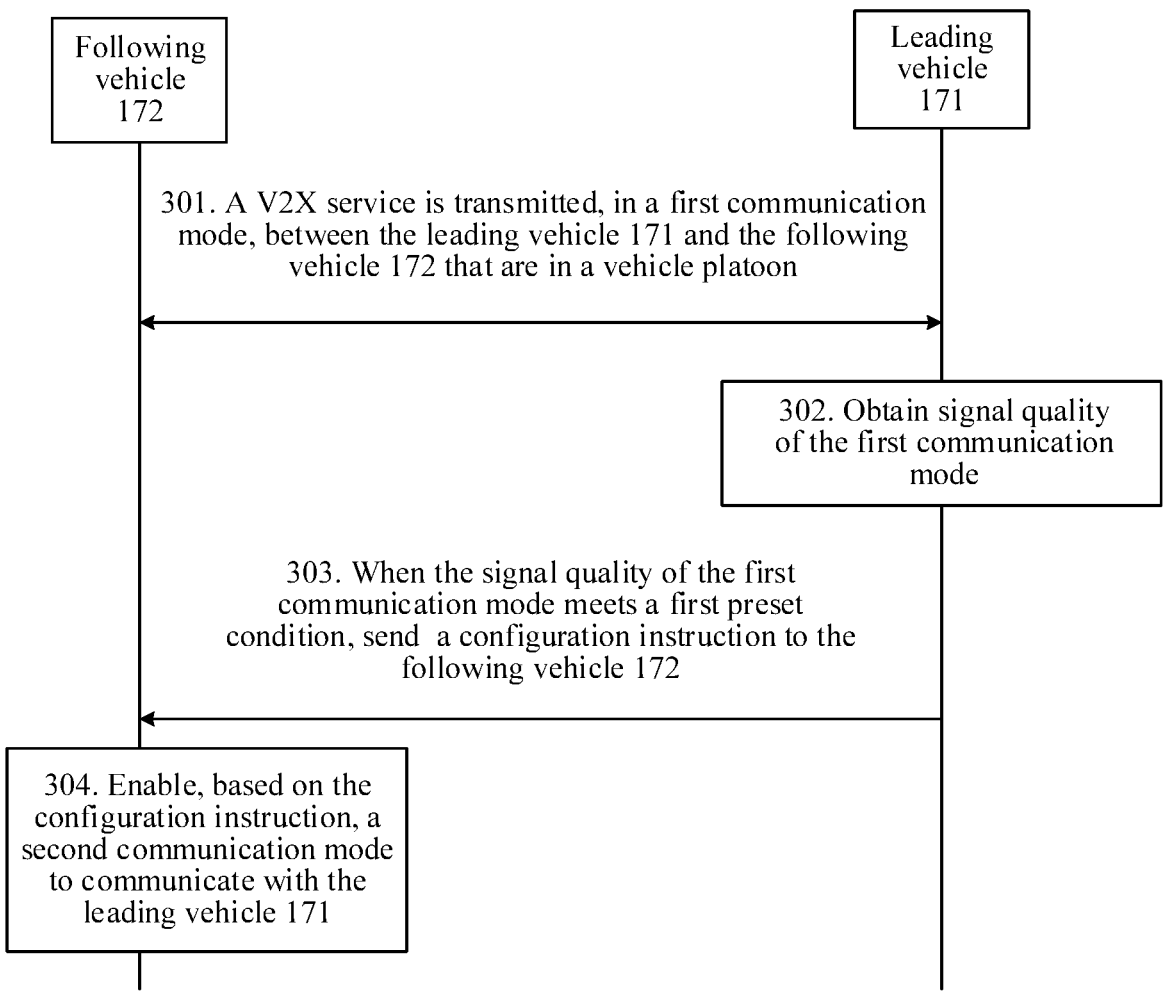
FIG. 3 is a flowchart of a communication mode selection method according to an embodiment of this application.

FIG. 3 is a flowchart of a communication mode selection method according to an embodiment of this application. The method may be applied to an application scenario of platooning shown in FIG. 2. The method may include the following several steps.

Step 301. A V2X service is transmitted, in a first communication mode, between a leading vehicle 171 and a following vehicle 172 that are in a vehicle platoon.

The first communication mode is a direct communication mode. The direct communication mode is a communication mode implemented using a D2D technology. For example, a direct link is established between the leading vehicle 171 and the following vehicle 172 using a PC5 interface, and the V2X service is transmitted using the direct link. The V2X service includes but is not limited to any information, such as a location, a road topology, a traffic light, steering, braking, or a lane change, that is exchanged between the leading vehicle 171 and the following vehicle 172. This is not limited in this embodiment of this application.

Step 302. The leading vehicle 171 obtains signal quality of the first communication mode.

The signal quality of the first communication mode is used to reflect a probability that a data packet of the V2X service is correctly received when the V2X service is transmitted between the leading vehicle 171 and the following vehicle 172 in the first communication mode. The signal quality of the first communication mode may be determined based on parameters such as a signal strength and a packet loss rate. The leading vehicle 171 may obtain the signal quality of the first communication mode every first preset time interval, and the first preset time interval may be a preset empirical value.

Step 303. When the signal quality of the first communication mode meets a first preset condition, the leading vehicle 171 sends a configuration instruction to the following vehicle 172.

The configuration instruction is used to instruct the following vehicle 172 to enable a second communication mode to communicate with the leading vehicle 171. The first preset condition is a preset condition specific to the signal quality of the first communication mode, and the condition is used to determine that the signal quality of the first communication mode is poor.

Step 304. The following vehicle 172 enables, based on the configuration instruction, the second communication mode to communicate with the leading vehicle 171.

The second communication mode is a communication mode in which a network device performs forwarding. For example, the following vehicle 172 communicates with the leading vehicle 171 using a Uu interface, to transmit the V2X service.

Optionally, after enabling the second communication mode, the following vehicle 172 does not disable the first communication mode. In other words, the following vehicle 172 communicates with the leading vehicle 171 in both the first communication mode and the second communication mode, to transmit the V2X service.

In the solution provided in this embodiment of this application, when the signal quality of the first communication mode meets the first preset condition, the leading vehicle 171 sends the configuration instruction to the following vehicle 172 such that the following vehicle 172 is triggered to enable the second communication mode to communicate with the leading vehicle 171. Because the second communication mode is the communication mode in which a network device performs forwarding, compared with the direct communication mode, the second communication mode has more stable signal quality. Therefore, it is ensured that service continuity between the leading vehicle 171 and the following vehicle 172 is not affected, and travelling safety of the vehicle is prevented from being threatened.

Figure 4:
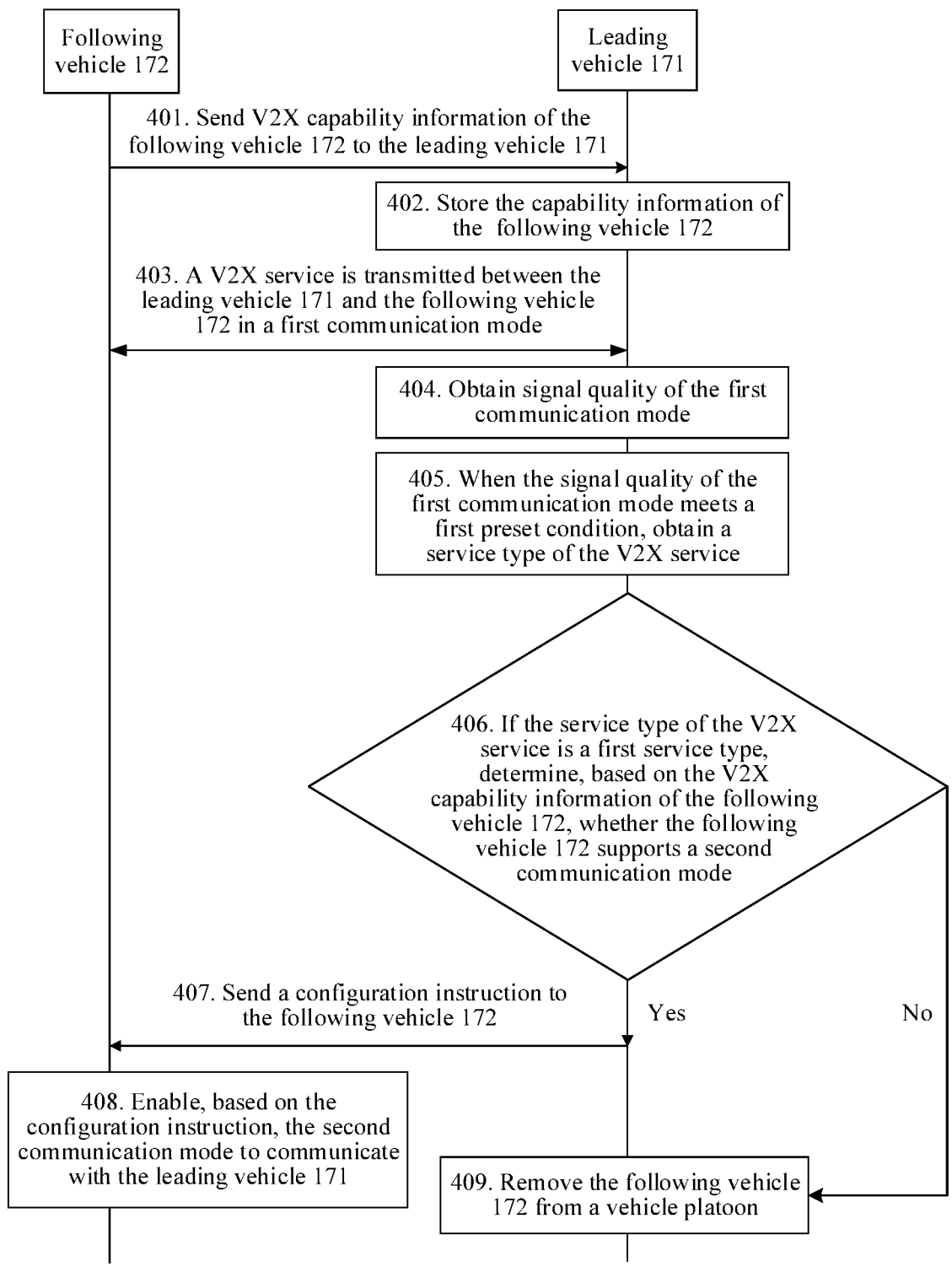
FIG. 4 is a flowchart of a communication mode selection method according to another embodiment of this application.

FIG. 4 is a flowchart of a communication mode selection method according to another embodiment of this application. The method may be applied to an application scenario of platooning shown in FIG. 2. The method may include the following several steps.

Step 401. A following vehicle 172 sends V2X capability information of the following vehicle 172 to a leading vehicle 171.

When a vehicle platoon is being established or the following vehicle 172 joins in the vehicle platoon, the following vehicle 172 sends the V2X capability information of the following vehicle 172 to the leading vehicle 171. The V2X capability information is used to indicate a communication mode supported by the following vehicle 172. For example, when the following vehicle 172 supports only a first communication mode, the following vehicle 172 sends first V2X capability information to the leading vehicle 171, and the first V2X capability information is used to indicate that the following vehicle 172 supports the first communication mode. Alternatively, when the following vehicle 172 supports the first communication mode and a second communication mode, the following vehicle 172 sends second V2X capability information to the leading vehicle 171, and the second V2X capability information is used to indicate that the following vehicle 172 supports the first communication mode and the second communication mode.

Optionally, when the vehicle platoon is being established or the following vehicle 172 joins in the vehicle platoon, the following vehicle 172 sends address information of the following vehicle 172 to the leading vehicle 171. The address information is used to indicate a communication address of the following vehicle 172. For example, the communication address includes any one or a combination of the following an Internet Protocol (IP) address, a media access control (MAC) address, and a port number. The communication address and the V2X capability information may be sent simultaneously or separately. This is not limited in this embodiment of this application.

Step 402. The leading vehicle 171 stores the V2X capability information of the following vehicle 172.

The leading vehicle 171 stores the V2X capability information of the following vehicle 172 such that in a subsequent step, the leading vehicle 171 determines, based on the V2X capability information of the following vehicle 172, the communication mode supported by the following vehicle 172, and therefore, determines whether to send a configuration instruction to the following vehicle 172.

Optionally, the leading vehicle 171 stores the address information of the following vehicle 172 such that in the subsequent step, when needing to perform V2X service transmission with the following vehicle 172, the leading vehicle 171 can communicate with the following vehicle 172 based on the communication address of the following vehicle 172.

Step 403. The V2X service is transmitted between the leading vehicle 171 and the following vehicle 172 in the first communication mode.

During platooning, the V2X service, for example, information such as a location, a road topology, a traffic light, steering, braking, and a lane change, is preferably transmitted between the leading vehicle 171 and the following vehicle 172 in the first communication mode. Because the first communication mode is a direct communication mode, and a delay is short and transmission efficiency is high when the V2X service is transmitted in the direct communication mode, the V2X service is preferably transmitted between the leading vehicle 171 and the following vehicle 172 in the first communication mode. Optionally, location information includes Global Positioning System (GPS) data, a travelling speed, and a travelling direction of the following vehicle. The following vehicle sends the location information of the following vehicle to the leading vehicle every third preset time interval. The third preset time interval may be a preset empirical value.

The V2X service transmitted between the leading vehicle 171 and the following vehicle 172 is used to ensure normal travelling of the vehicle platoon. For example, when the vehicle platoon travels to a downhill road, the leading vehicle 171 needs to decelerate when detecting that a road ahead is the downhill road. In this case, the leading vehicle 171 sends, to the following vehicle 172, information used to indicate travelling with deceleration. After receiving the information used to indicate travelling with deceleration, the following vehicle 172 travels with deceleration. Finally, the entire vehicle platoon travels with deceleration, and safely travels through the downhill road.

Step 404. The leading vehicle 171 obtains signal quality of the first communication mode.

Optionally, the signal quality is signal reliability. The signal reliability is related to parameters such as a signal strength and a packet loss rate. A higher signal strength and a lower packet loss rate indicate higher signal reliability, on the contrary, a lower signal strength and a higher packet loss rate indicate lower signal reliability.

Optionally, the leading vehicle 171 obtains signal reliability that is of communication with the following vehicle 172 in the first communication mode and that is in a first time window. In an example, the first time window may be measured using a time range. For example, the first time window is a first preset time period. Every first preset time period, the leading vehicle 171 collects statistics about signal reliability that is of communication with the following vehicle 172 in the first communication mode and that is within the first preset time period. In another example, the first time window may alternatively be measured using a quantity of pieces of information. For example, the first time window is a first quantity of pieces of information. Each time receiving information of the first quantity of pieces of information, the leading vehicle 171 collects statistics about signal reliability that is of communication with the following vehicle 172 in the first communication mode and that is within a time period in which the first quantity of pieces of information are received. A value of the first preset time period and a value of the first quantity of pieces of information may be both preset empirical values.

Step 405. When the signal quality of the first communication mode meets a first preset condition, the leading vehicle 171 obtains a service type of the V2X service.

When the signal quality is the signal reliability, the first preset condition is included in the first time window, and the signal reliability is less than a first threshold. The first threshold is a determining threshold preset for the signal reliability, for example, the first threshold is preset to 90%. The leading vehicle 171 detects whether the signal quality of the first communication mode meets the first preset condition, in other words, detects whether the signal reliability of the first communication mode is less than the first threshold in the first time window. If the signal reliability of the first communication mode is less than the first threshold, when the V2X service is transmitted between the leading vehicle 171 and the following vehicle 172 in the first communication mode, a case such as a transmission failure or transmission information missing may occur. Therefore, when the signal quality of the first communication mode meets the first preset condition, service continuity between the leading vehicle 171 and the following vehicle 172 is affected.

When the signal quality of the first communication mode meets the first preset condition, the leading vehicle 171 obtains a service type of the currently transmitted V2X service. Optionally, the service type of the V2X service includes a first service type and a second service type. The first service type means a service related to vehicle travelling safety, such as braking, a lane change, or steering. The second service type means a service not related to vehicle travelling safety, such as a location or a road topology. In this embodiment of this application, specific services included in the first service type and the second service type are not limited. The specific services may be preconfigured by a designer according to actual experience, or may be customized by a user in advance.

Optionally, each V2X service corresponds to a service identifier. The service identifier is used to uniquely indicate a V2X service, and different V2X services correspond to different service identifiers. For example, a service identifier corresponding to travelling with deceleration is 001, and a service identifier corresponding to travelling with acceleration is 002. In addition, there is a correspondence between a service identifier and a service type. Based on the correspondence and a service identifier corresponding to the current V2X service, the leading vehicle 171 obtains the service type of the V2X service.

Step 406. If the service type of the V2X service is the first service type, the leading vehicle 171 determines, based on the V2X capability information of the following vehicle 172, whether the following vehicle 172 supports the second communication mode. If the following vehicle 172 supports the second communication mode, the following step 407 is performed, or if the following vehicle 172 does not support the second communication mode, the following step 409 is performed.

After obtaining the service type of the currently transmitted V2X service, the leading vehicle 171 detects whether the service type of the currently transmitted V2X service is the first service type.

If the service type of the currently transmitted V2X service is the first service type, in other words, the currently transmitted V2X service relates to vehicle travelling safety, the second communication mode needs to be enabled for communication, to ensure that the service continuity between the leading vehicle 171 and the following vehicle 172 is not affected. Before the second communication mode is enabled, the leading vehicle 171 needs to determine whether the following vehicle 172 supports the second communication mode.

If the service type of the currently transmitted V2X service is the second service type, the currently transmitted V2X service does not relate to vehicle travelling safety. Even if the service continuity between the leading vehicle 171 and the following vehicle 172 is affected, travelling safety of the vehicle is not affected. In this case, the second communication mode does not need to be enabled. The current V2X service continues to be transmitted between the leading vehicle 171 and the following vehicle 172 in the first communication mode, and the vehicle platoon continues to travel.

Step 407. The leading vehicle 171 sends the configuration instruction to the following vehicle 172.

When the following vehicle 172 supports the second communication mode, the leading vehicle 171 sends the configuration instruction to the following vehicle 172. The configuration instruction is used to instruct the following vehicle 172 to enable the second communication mode to communicate with the leading vehicle 171.

Step 408. The following vehicle 172 enables, based on the configuration instruction, the second communication mode to communicate with the leading vehicle 171.

Optionally, after enabling the second communication mode, the following vehicle 172 does not disable the first communication mode, and can still perform V2X service transmission with the leading vehicle 171 in the first communication mode. For example, the first communication mode is a mode in which communication is performed using a PC5 interface, and the second communication mode is a mode in which communication is performed using a Uu interface. After the second communication mode is enabled, when transmitting a V2X service to the following vehicle 172, the leading vehicle 171 transmits the V2X service to the following vehicle 172 using the PC5 interface, and simultaneously, transmits the V2X service to the following vehicle 172 using the Uu interface.

Step 409. The leading vehicle 171 removes the following vehicle 172 from the vehicle platoon.

When the following vehicle 172 does not support the second communication mode, the leading vehicle 171 cannot communicate with the following vehicle 172 in the second communication mode, and consequently, it cannot be ensured that the service continuity between the leading vehicle 171 and the following vehicle 172 is not affected. In this case, the leading vehicle 171 removes the following vehicle 172 from the vehicle platoon, to avoid that travelling safety of the following vehicle 172 is affected because the service continuity is affected.

Optionally, in addition to removing the following vehicle 172 from the vehicle platoon, the leading vehicle 171 sends an instruction to leave the vehicle platoon to the following vehicle 172. The instruction to leave the vehicle platoon is used to instruct the following vehicle 172 to travel away from the vehicle platoon. After receiving the instruction to leave the vehicle platoon, the following vehicle 172 travels away from the vehicle platoon.

In the solution provided in this embodiment, when the signal quality of the first communication mode meets the first preset condition, the leading vehicle 171 sends the configuration instruction to the following vehicle 172 such that the following vehicle 172 is triggered to enable the second communication mode to communicate with the leading vehicle 171. Because the second communication mode is the communication mode in which a network device performs forwarding, compared with the direct communication mode, the second communication mode has more stable signal quality. Therefore, it is ensured that the service continuity between the leading vehicle 171 and the following vehicle 172 is not affected, and the travelling safety of the vehicle is prevented from being threatened.

In addition, when determining that the service type of the currently transmitted V2X service is the first service type, the leading vehicle 171 sends, to the following vehicle 172, the configuration instruction used to indicate enabling of the second communication mode. In this way, reliable transmission of an important service can be ensured, and in addition, the second communication mode is prevented from being enabled when a non-important service is transmitted such that a communication resource is saved.

In addition, when the vehicle platoon is being established or the following vehicle 172 joins in the vehicle platoon, the following vehicle 172 sends the V2X capability information of the following vehicle 172 to the leading vehicle 171 such that when determining that the second communication mode needs to be enabled, the leading vehicle 171 can accurately determine whether the following vehicle 172 supports the second communication mode. When the following vehicle 172 does not support the second communication mode, the leading vehicle 171 removes the following vehicle 172 from the vehicle platoon, to avoid that travelling safety of another vehicle is threatened because travelling of the other vehicle is affected by the following vehicle 171.

In the embodiments in FIG. 3 and FIG. 4, that the communication mode is selected by the leading vehicle 171 in the application scenario of platooning is described. In the following embodiment in FIG. 5, that the communication mode is selected by the following vehicle 172 in the application scenario of platooning is described.

Figure 5:
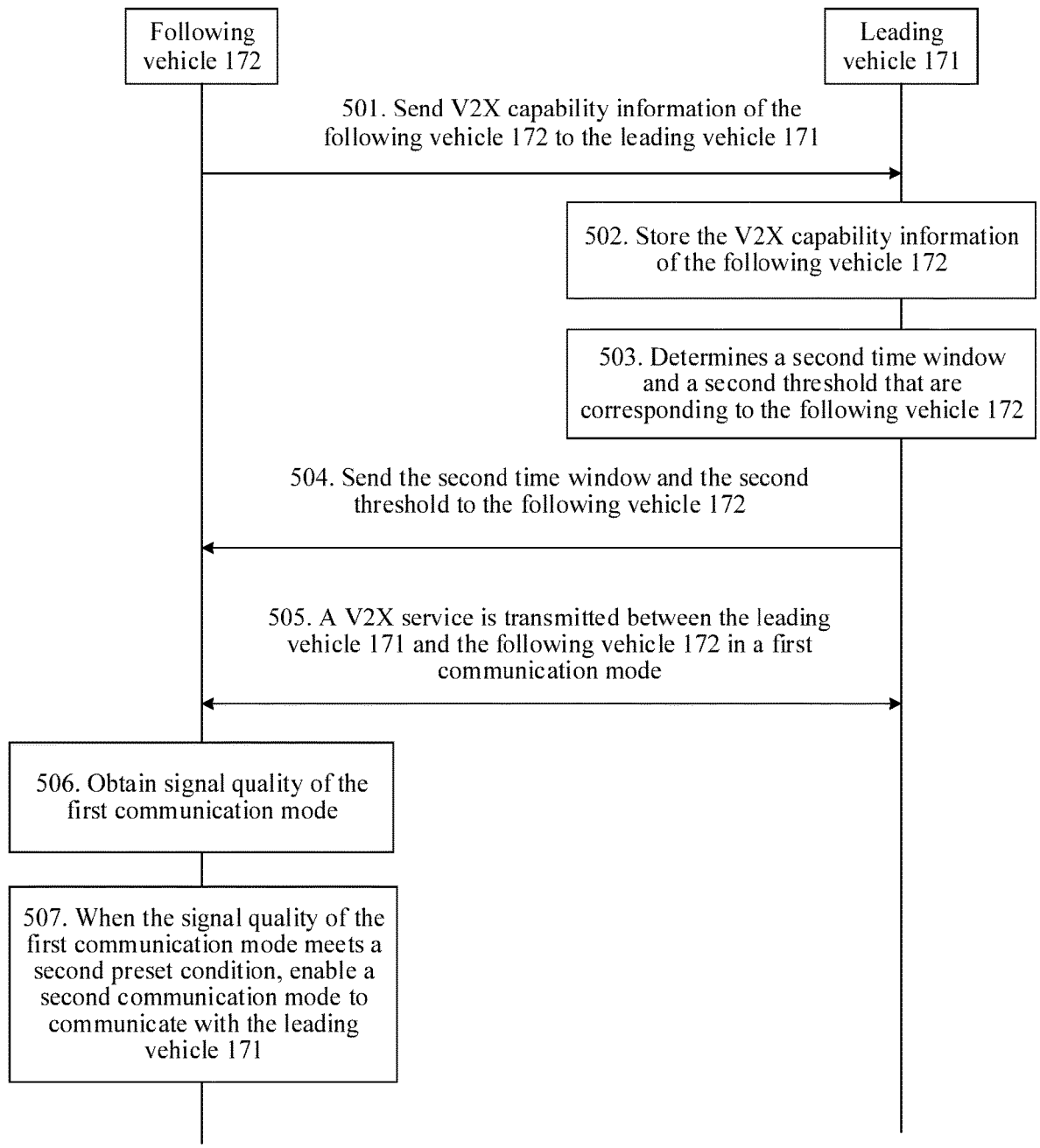
FIG. 5 is a flowchart of a communication mode selection method according to another embodiment of this application.

FIG. 5 is a flowchart of a communication mode selection method according to another embodiment of this application. The method may be applied to an application scenario of platooning shown in FIG. 2. The method may include the following several steps.

Step 501. A following vehicle 172 sends V2X capability information of the following vehicle 172 to a leading vehicle 171.

Optionally, when a vehicle platoon is being established or the following vehicle 172 joins the vehicle platoon, in addition to sending the V2X capability information to the leading vehicle 171, the following vehicle 172 sends a self-driving level of the following vehicle 172 to the leading vehicle 171. The self-driving level is used to indicate a level of a self-driving capability supported by the following vehicle 172. A higher self-driving level indicates more self-driving functions supported by the following vehicle 172 and a higher capability, and a lower self-driving level indicates less self-driving functions supported by the following vehicle 172 and a lower capability. The self-driving level may be pre-configured and pre-classified. This is not limited in this embodiment of this application. For example, the self-driving level is classified into five levels from 0 to 4 according to a standard of the National Highway Traffic Safety Administration (NHTSA).

Step 502. The leading vehicle 171 stores the V2X capability information of the following vehicle 172.

Step 503. The leading vehicle 171 determines a second time window and a second threshold that correspond to the following vehicle 172.

The second time window and the second threshold are set by the leading vehicle 171 for the following vehicle 172, and are parameters used when the following vehicle 172 determines signal reliability. The second time window is a second preset time period or a second quantity of pieces of information. A value of the second preset time period and a value of the second quantity of pieces of information may be both preset empirical values. The second threshold is a determining threshold preset for the signal reliability, for example, the second threshold is preset to 60%. Optionally, the second threshold is less than a first threshold.

In a possible implementation, all following vehicles 172 in the vehicle platoon correspond to a same second time window and a same second threshold.

In another possible implementation, all the following vehicles 172 in the vehicle platoon correspond to different second time windows and different second thresholds. For example, the leading vehicle 171 determines, based on the self-driving level of the following vehicle 172, the second time window and the second threshold that correspond to the following vehicle 172. The higher self-driving level indicates a smaller value of the second threshold and a larger value of the second time window, and the lower self-driving level indicates a larger value of the second threshold and a smaller value of the second time window.

Step 504. The leading vehicle 171 sends the second time window and the second threshold to the following vehicle 172.

Step 505. A V2X service is transmitted between the leading vehicle 171 and the following vehicle 172 in a first communication mode.

Step 506. The following vehicle 172 obtains signal quality of the first communication mode.

Optionally, the signal quality is the signal reliability. The signal reliability is related to parameters such as a signal strength and a packet loss rate. A higher signal strength and a lower packet loss rate indicate higher signal reliability, on the contrary, a lower signal strength and a higher packet loss rate indicate lower signal reliability.

Optionally, the following vehicle 172 obtains the signal quality of the first communication mode every second preset time interval, and the second preset time interval may be a preset empirical value.

Optionally, the following vehicle 172 obtains signal reliability that is of communication with the leading vehicle 171 in the first communication mode and that is in the second time window.

Step 507. When the signal quality of the first communication mode meets a second preset condition, the following vehicle 172 enables a second communication mode to communicate with the leading vehicle 171.

The second preset condition is a preset condition specific to the signal quality of the first communication mode, and the condition is used to determine that the signal quality of the first communication mode is poor.

When the signal quality is the signal reliability, the second preset condition is included in the second time window, and the signal reliability is less than the second threshold. The following vehicle 172 detects whether the signal quality of the first communication mode meets the second preset condition, in other words, detects whether the signal reliability of the first communication mode is less than the second threshold in the second time window. If the signal reliability of the first communication mode is less than the second threshold, when the V2X service is transmitted between the leading vehicle 171 and the following vehicle 172 in the first communication mode, a case such as a transmission failure or transmission information missing may occur. Therefore, when the signal quality of the first communication mode meets the second preset condition, service continuity between the leading vehicle 171 and the following vehicle 172 is affected. Therefore, when the signal quality of the first communication mode meets the second preset condition, the following vehicle 172 enables the second communication mode to communicate with the leading vehicle 171.

Optionally, after enabling the second communication mode to communicate with the leading vehicle 171, the following vehicle 172 does not disable the first communication mode. In other words, the following vehicle 172 communicates with the leading vehicle 171 in both the first communication mode and the second communication mode, to transmit the V2X service.

Optionally, if the following vehicle 172 does not support the second communication mode, the following vehicle 172 travels away from the vehicle platoon.

Optionally, when the following vehicle 172 travels away from the vehicle platoon, the following vehicle 172 sends departure information to the leading vehicle 171. The departure information is used to instruct the leading vehicle 171 to remove the following vehicle 172 from the vehicle platoon.

In the solution provided in this embodiment, when the signal quality of the first communication mode meets the second preset condition, the following vehicle 172 automatically enables the second communication mode to communicate with the leading vehicle 171. Because the second communication mode is a communication mode in which a network device performs forwarding, compared with a direct communication mode, the second communication mode has more stable signal quality. Therefore, it is ensured that the service continuity between the leading vehicle 171 and the following vehicle 172 is not affected, and travelling safety of the vehicle is prevented from being threatened.

In addition, when the following vehicle 172 does not support the second communication mode, the following vehicle 172 actively travels away from the vehicle platoon, to avoid threatening travelling safety of another vehicle because of affecting travelling of the vehicle.

The foregoing mainly describes the solutions provided in the embodiments of this application from a perspective of interaction between the leading vehicle 171 and the following vehicle 172. It may be understood that, an in-vehicle communications apparatus of the vehicle includes a corresponding hardware structure and/or software module for performing each function to implement the foregoing functions. With reference to the modules and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the in-vehicle communications apparatus may be divided into function modules based on the foregoing method examples. For example, each function module may be obtained through division based on each function, or two or more functions may be integrated into one processing module. The integrated module may be implemented in a form of hardware, or may be implemented in a form of a software functional module. It should be noted that, in this embodiment of this application, module division is an example, and is merely a logical function division. In an embodiment, another division manner may be used.

Figure 6A:
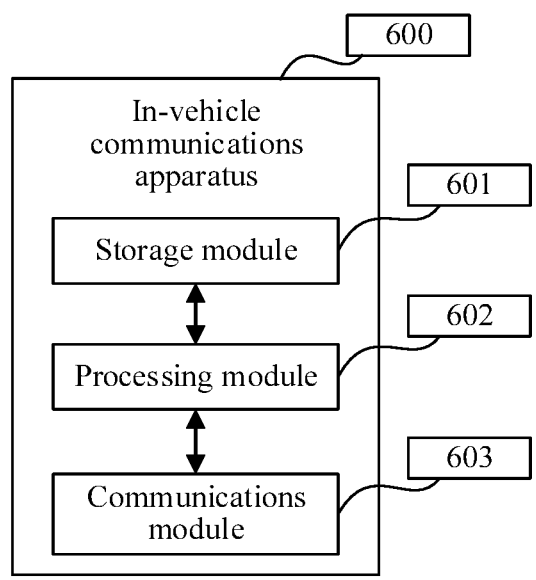
FIG. 6A is a schematic block diagram of an in-vehicle communications apparatus according to an embodiment of this application.

When the integrated module is used, FIG. 6A is a possible schematic structural diagram of the in-vehicle communications apparatus in the foregoing embodiments. The in-vehicle communications apparatus 600 includes a processing module 602 and a communications module 603. The processing module 602 is configured to control and manage an action of the in-vehicle communications apparatus 600. For example, when the in-vehicle communications apparatus 600 is an in-vehicle communications apparatus of a leading vehicle 171, the processing module 602 is configured to support the in-vehicle communications apparatus 600 to perform steps 301 to 303 in FIG. 3, steps 402 to 407 and step 409 in FIG. 4, and steps 502 to 505 in FIG. 5, and/or to perform another step of the technology described in this specification. When the in-vehicle communications apparatus 600 is an in-vehicle communications apparatus of a following vehicle 172, the processing module 602 is configured to support the in-vehicle communications apparatus 600 to perform step 301 and step 304 in FIG. 3, step 401, step 403, and step 408 in FIG. 4, and step 501 and steps 506 and 507 in FIG. 5, and/or to perform another step of the technology described in this specification. The communications module 603 is configured to support communication between the in-vehicle communications apparatus 600 and an in-vehicle communications apparatus of another vehicle or another device. The in-vehicle communications apparatus 600 may further include a storage module 601 configured to store program code and data of the in-vehicle communications apparatus 600.

The processing module 602 may be a processor or a controller, such as a central processing unit (CPU), a general-purpose processor, a digital signal processor (DSP), an application-specific integrated circuit (ASIC), a field-programmable gate array (FPGA), or another programmable logical device, a transistor logical device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 603 may be a communications interface, a transceiver, a transceiver circuit, or the like. The communications interface is a general term, and may include one or more interfaces, such as an interface between an in-vehicle communications apparatus of one vehicle and an in-vehicle communications apparatus of another vehicle, and an interface between an in-vehicle communications apparatus and an access network device. The storage module 601 may be a memory.

Figure 6B:
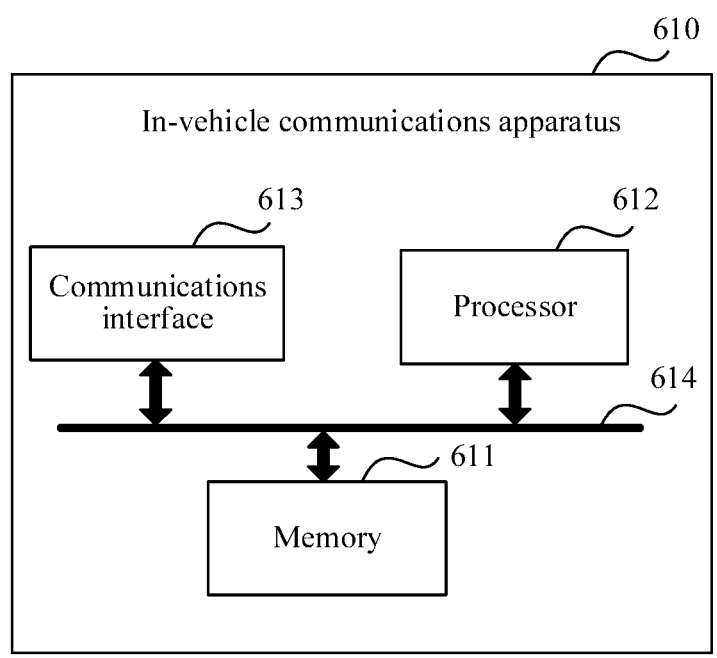
FIG. 6B is a schematic structural diagram of an in-vehicle communications apparatus according to an embodiment of this application.

When the processing module 602 is a processor, the communications module 603 is a communications interface, and the storage module 601 is a memory, the in-vehicle communications apparatus in this embodiment of this application may be an in-vehicle communications apparatus shown in FIG. 6B.

Referring to FIG. 6B, the in-vehicle communications apparatus 610 includes a processor 612, a communications interface 613, and a memory 611. Optionally, the in-vehicle communications apparatus 610 may further include a bus 614. The communications interface 613, the processor 612, and the memory 611 are interconnected using the bus 614. The bus 614 may be a Peripheral Component Interconnect (PCI) bus, an Extended Industry Standard Architecture (EISA) bus, or the like. The bus 614 may be classified into an address bus, a data bus, a control bus, and the like. For ease of representation, only one thick line is used to represent the bus in FIG. 6B, but this does not mean that there is only one bus or only one type of bus.

Steps of the methods described in combination with the content disclosed in this embodiment of this application may be implemented by hardware, or may be implemented by a processor by executing a software instruction. The software instruction may include a corresponding software module. The software module may be stored in a random-access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in an in-vehicle communications apparatus. Certainly, the processor and the storage medium may exist in the in-vehicle communications apparatus as discrete components.

A person skilled in the art should be aware that in the foregoing one or more examples, functions described in the embodiments of this application may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on technical solutions of the embodiments of this application shall fall within the protection scope of the embodiments of this application.

What is claimed is:

1. A communication mode selection method, implemented by a leading vehicle, wherein the communication mode selection method comprises:
 transmitting, in a first communication mode, a vehicle-to-everything (V2X) service between the leading vehicle and a following vehicle that are in a vehicle platoon, wherein the first communication mode is a direct communication mode;
 obtaining a signal quality of the first communication mode, wherein the signal quality is signal reliability;
 obtaining a signal reliability of communication between the following vehicle and the leading vehicle in the first communication mode and in a time window; and
 sending a configuration instruction to the following vehicle when the signal quality of the first communication mode meets a preset condition,
 wherein the configuration instruction instructs the following vehicle to enable a second communication mode to communicate with the leading vehicle,
 wherein the second communication mode is for network device forwarding, and
 wherein the preset condition identifies the signal reliability in the time window is less than a threshold.

2. The communication mode selection method of claim 1, further comprising:
 determining whether the second communication mode is compatible with the following vehicle based on V2X capability information of the following vehicle when the signal quality of the first communication mode meets the preset condition, wherein the V2X capability information indicates whether a communication mode is compatible with the following vehicle; and
 sending the configuration instruction to the following vehicle when the second communication mode is compatible with the following vehicle.

3. The communication mode selection method of claim 1, further comprising:
 determining whether the second communication mode is compatible with the following vehicle based on V2X capability information of the following vehicle when the signal quality of the first communication mode meets the preset condition, wherein the V2X capability information indicates whether a communication mode is compatible with the following vehicle; and removing the following vehicle from the vehicle platoon when the second communication mode is incompatible with the following vehicle.

4. The communication mode selection method of claim 1, wherein before obtaining the V2X service between the leading vehicle and the following vehicle, the communication mode selection method further comprises:
obtaining V2X capability information of the following vehicle; and
storing the V2X capability information of the following vehicle.

5. The communication mode selection method of claim 1, wherein the leading vehicle is a first vehicle in the vehicle platoon in a direction of forward motion, and wherein the leading vehicle is configured to create and manage the vehicle platoon.

6. The communication mode selection method of claim 1, wherein the leading vehicle and the following vehicle communicate using a PC5 interface or a dedicated short range communication (DSRC) technology.

7. A communication mode selection method, implemented by a following vehicle, wherein the communication mode selection method comprises:
sending vehicle-to-everything (V2X) capability information of the following vehicle to a leading vehicle, wherein the V2X capability information indicates a communication mode supported by the following vehicle;
obtaining a signal quality of a first communication mode;
obtaining signal reliability of communication with the leading vehicle in the first communication mode and in a time window;
enabling a second communication mode to communicate with the leading vehicle when the signal quality of the first communication mode meets a preset condition, wherein the signal quality is the signal reliability, and wherein the preset condition indicates the signal reliability in the time window is less than a second threshold;
transmitting, in the first communication mode, a V2X service between the following vehicle and the leading vehicle that are in a vehicle platoon, wherein the first communication mode is a direct communication mode;
receiving a configuration instruction from the leading vehicle; and
enabling the second communication mode to communicate with the leading vehicle based on the configuration instruction,
wherein the second communication mode is for network device forwarding.

8. The communication mode selection method of claim 7, further comprising travelling away from the vehicle platoon when the signal quality of the first communication mode meets the preset condition and when the following vehicle does not support the second communication mode.

9. The communication mode selection method of claim 7, wherein the leading vehicle is a first vehicle in the vehicle platoon in a direction of forward motion, and wherein the leading vehicle is configured to create and manage the vehicle platoon.

10. The communication mode selection method of claim 7, wherein the leading vehicle and the following vehicle communicate using a PC5 interface or a dedicated short range communication (DSRC) technology.

11. A communications apparatus, installed on a leading vehicle, wherein the communications apparatus comprises:
a processor; and
a memory coupled to the processor and storing instructions that, when executed by the processor, cause the communications apparatus to be configured to:
perform vehicle-to-everything (V2X) service transmission in a first communication mode with a following vehicle in a vehicle platoon, wherein the first communication mode is a direct communication mode;
obtain signal quality of the first communication mode, wherein the signal quality is signal reliability;
obtain signal reliability of communication between the following vehicle and the leading vehicle in the first communication mode and in a time window; and
send a configuration instruction to the following vehicle when the signal quality of the first communication mode meets a preset condition,
wherein the configuration instruction instructs the following vehicle to enable a second communication mode to communicate with the leading vehicle in the vehicle platoon, platoon, and
wherein the second communication mode is a communication mode in which a network device performs forwarding, and
wherein the preset condition identifies the signal reliability in the time window is less than a threshold.

12. The communications apparatus of claim 11, wherein when the signal quality of the first communication mode meets the preset condition the instructions further cause the processor to be configured to:
determine whether the second communication mode is compatible with the following vehicle based on V2X capability information of the following vehicle, wherein the V2X capability information indicates whether a communication mode is compatible with the following vehicle; and
send the configuration instruction to the following vehicle when the second communication mode is compatible with the following vehicle.

13. The communications apparatus of claim 11, wherein when the signal quality of the first communication mode meets the preset condition the instructions further cause the processor to be configured to:
determine whether the second communication mode is compatible with the following vehicle based on V2X capability information of the following vehicle, wherein the V2X capability information indicates whether a communication mode is compatible with the following vehicle; and
remove the following vehicle from the vehicle platoon when the second communication mode is incompatible with the following vehicle.

14. The communications apparatus of claim 11, wherein the instructions further cause the processor to be configured to:
obtain V2X capability information of the following vehicle; and
store the V2X capability information of the following vehicle.

15. The communication apparatus of claim 11, wherein the leading vehicle is a first vehicle in the vehicle platoon in a direction of forward motion, and wherein the leading vehicle is configured to create and manage the vehicle platoon.

16. The communication apparatus of claim 11, wherein the leading vehicle and the following vehicle communicate using a PC5 interface or a dedicated short range communication (DSRC) technology.

17. A communication apparatus, installed on a following vehicle, wherein the communication apparatus comprises:
a processor; and
a memory coupled to the processor and storing instructions that, when executed by the processor, cause the communication apparatus to be configured to:
send vehicle-to-everything (V2X) capability information of the following vehicle in a vehicle platoon to a leading vehicle, wherein the V2X capability information indicates the following vehicle supports a communication mode;
obtain signal quality of a first communication mode;
enable a second communication mode to communicate with the leading vehicle when the signal quality of the first communication mode meets a preset condition;
obtain signal reliability of communication with the leading vehicle in the first communication mode and in a time window, wherein the preset condition indicates the signal reliability in the time window is less than a second threshold;
perform V2X vehicle to everything (V2X) service transmission in the first communication mode between the following vehicle and the leading vehicle that are in the vehicle platoon, wherein the first communication mode is a direct communication mode;
receive a configuration instruction from the leading vehicle; and
enable, based on the configuration instruction, a second communication mode to communicate with the leading vehicle,
wherein the second communication mode is a communication mode in which a network device performs forwarding.

18. The communication apparatus of claim 17, wherein the instructions further cause the processor to be configured to travel away from the vehicle platoon when the signal quality of the first communication mode meets the preset condition and when the following vehicle does not support the second communication mode.

19. The communication apparatus of claim 17, wherein the leading vehicle is a first vehicle in the vehicle platoon in a direction of forward motion, and wherein the leading vehicle is configured to create and manage the vehicle platoon.

20. The communication apparatus of claim 17, wherein the leading vehicle and the following vehicle communicate using a PC5 interface or a dedicated short range communication (DSRC) technology.

* * * * *

UNITED STATES PATENT AND TRADEMARK OFFICE
CERTIFICATE OF CORRECTION

PATENT NO. : 11,457,459 B2
APPLICATION NO. : 16/930609
DATED : October 4, 2022
INVENTOR(S) : Xiaoguang Chen It is certified that error appears in the above-identified patent and that said Letters Patent is hereby corrected as shown below:

In the Claims

Claim 11, Column 20, Line 20: "platoon, platoon, and" should read "platoon,"

Claim 17, Column 21, Line 21: "perform V2X vehicle to everything (V2X) service" should read "perform V2X service"

Signed and Sealed this
Twentieth Day of December, 2022

Katherine Kelly Vidal
*Director of the United States Patent and Trademark Office*